Jan. 20, 1942.                W. M. ROBINSON                    2,270,740
                             ELECTRICAL CAPACITOR
                              Filed July 13, 1939

INVENTOR.
                                                    William M. Robinson
                                              BY
                                                    J. O. Ollier
                                                          ATTORNEY.

Patented Jan. 20, 1942

2,270,740

UNITED STATES PATENT OFFICE 2,270,740

ELECTRICAL CAPACITOR

William M. Robinson, Plainfield, N. J., assignor to Cornell-Dubilier Electric Corporation, South Plainfield, N. J., a corporation of Delaware Application July 13, 1939, Serial No. 284,152

4 Claims. (Cl. 175—315)

This invention relates to electrical capacitors, in particular electrostatic and electrolytic condensers.

Capacitors of this type usually comprise two electrodes spaced from each other by one or more separators of the same or different materials, particularly paper of the same or different porosity and/or thickness, or gauze, or similar more or less absorbent materials. If an electrostatic condenser is concerned, the separators are suitably impregnated with an additional di-electric material such as oil or similar insulating substances. If an electrolytic condenser is concerned, the separators are impregnated with a suitable electrolyte.

The electrodes with interleaved separators are wound to form an approximately cylindrical body and the wound body is positioned in a casing. The latter has to protect the condenser body against moisture and mechanical injuries, and may be insulating.

Heretofore, these casings have been made of moldable material such as synthetic resins known under the trade name Bakelite, or of metal or paper (cardboard).

Casings of synthetic resin are mostly infusable but carbonize at higher temperatures. There are also difficulties in properly sealing them after the condenser body has been inserted. Casings of metal can be manufactured in any desired shape and the assembly does not meet with difficulties. They are, however, electrically conductive. Casings of paper are the cheapest and have proven usable to a great extent. Their assembly is easy too, they have, however, the drawback that they are inflammable and do not meet the underwriter's requirements.

It is an object of the invention to utilize casings consisting substantially of metal or paper as they are easy and cheap to manufacture and assemble without encountering the drawbacks as to electrical conductivity and inflammability.

Another object of the invention is to provide a capacitor with a casing which is not inflammable and can be made and assembled as easily and cheaply as usual metal, paper or cardboard casings.

Figure 1:
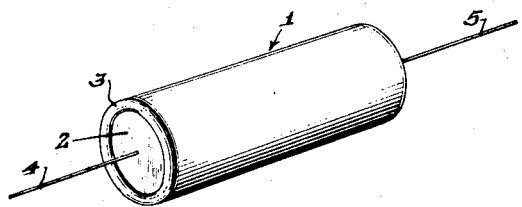
Figure 2:
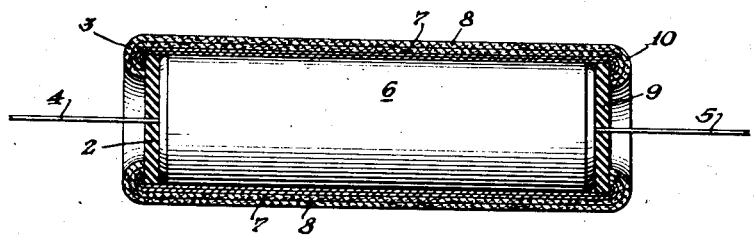

These and other objects of the invention will be more clearly understood when the specification proceeds with reference to the drawing, in which Fig. 1 shows a perspective view of an assembled condenser according to the invention and Fig. 2 a cross section therethrough with the condenser body in elevation.

According to the invention the casing of the condenser is constituted entirely of asbestos, or of an inner portion or support of metal, paper, cardboard or like material which can be easily shaped and an outside all over covering thereof consisting of asbestos, in particular asbestos paper, felt or fibres.

Referring to the drawing, in Fig. 1 is a tube in which the condenser body is positioned and 2 a washer or cover inserted into the open end of the tube and held in place by rolling or bending the edge 3 of the tube thereover. 4 and 5 are terminal leads passed through the washer or cover 2.

As to be seen from the cross section through a condenser of the invention shown in Fig. 2, the wound body 6 of an electrostatic or electrolytic condenser of the type disclosed above is inserted into a tube constituted of an inner portion 7 and an outer portion 8. It is assumed in the drawing that the inner tubular portion 7 consists of cardboard or paper which is made in a convenient and wellknown way.

If paper is used, it may be wound into the tubular body by winding a paperstrip in overlapping helical windings into many layers connected together by any suitable glue or varnish.

If cardboard is used, the pulp may be pressed in any convenient way into the tubular shape of desired thickness. Instead of a tube of paper or cardboard, of course, any other material which is inflammable, can be used. The tube may also be made of metal.

Portion 8 consists of asbestos which is either brought into tubular shape separately or together with the portion 7. In the first case the asbestos tube is slipped over the tube 7 and connected therewith, if desired, by means of glue, varnish or the like. In the latter case, either a coherent asbestos sheet is applied unto the paper or cardboard sheet in desired thickness and connected therewith by glue or varnish and thereafter this unit is shaped into a tube, or asbestos wool or fibres are applied unto the paper or cardboard by glue or varnish which is not inflammable such as Bakelite varnish, and the whole then shaped into the desired tube.

The condenser body 6 is provided with terminal leads 4, 5 and inserted into the tube 7, 8. Thereafter washers 2 and 9 are inserted into the open ends of tube 7, 8. The washers are provided with holes through which the terminal leads 4, 5 snugly pass. The washers fit as snugly as possible into the open ends of the tube. They also consist of asbestos pressed into the desired shape. They may also be obtained by punching out of an asbestos plate of desired thickness. Instead of using a washer consisting entirely of asbestos, a washer may be used comprising an inside support such as of paper or cardboard and an outside cover of asbestos in a similar way as has been described above with reference to the tube 7, 8.

The edges 3 and 10 of the open tube 7, 8 are now rolled or bent over the washers 2 and 9 so as to seal them firmly in position.

Thereby the assembly of the condenser is completed.

Prior to spinning or pressing over the ends of the tube 7, 8, a small quantity of hot chlorinated wax may be placed around the inside end portion of the tube in order to strengthen and stiffen the rolled-over edge.

It will be appreciated from the above that a condenser body 6 of any desired structure is covered by a housing (casing) consisting all over its outside of non-inflammable asbestos whereby the body and other inflammable parts of the condenser are fully protected against inflammation.

It is to be understood that the invention is not limited to the exemplification shown in the drawing but to be derived in its broadest aspect from the appended claims. Thus it is to be understood that the tube 1 may consist entirely of compacted asbestos wool or fibres which is shaped e. g. by pressing. The fibrous asbestos tugging and washers may be made by suspending the asbestos fibers in a water solution to which gum or binder has been added and then filtering out the asbestos fibers into a perforated form conforming to the shape of the tube or washer desired, or fibrous asbestos sheets may be produced by paper making process and then the sheet may be spirally wound into a tube using ordinary glue to secure the wrapping together. It is further to be understood that if the casing is made entirely of asbestos in the way described above or of asbestos and a support of paper, cardboard or other insulating material, the terminal leads can be passed through the tops or covers of the casing without additional insulation. Obviously other material such as cellulose acetate, Cellophane and other cellulose compounds may be used for the base tube, or various thermoplastics such as ethyl cellulose, shellac, cellulose acetate and other natural or artificial resins may be incorporated with the asbestos fibers into a tube without departing from the scope of my invention.

If metal is used for an inner support, it will be appreciated by anyone skilled in the art that a suitable insulation has to be provided between the inner metal casing and the condenser body, if its structure requires it. Such an insulation has to be provided also between the washers and the terminal leads in case conductive material is used as an inner support for them.

What I claim is:

1. In a paper capacitor, a convolute capacitor body consisting of metallic and paper strips wound into a roll, a protective cardboard casing enveloping said capacitor body, and a layer of asbestos completely covering the outer surface of said cardboard casing, and a layer of non-inflammable varnish affixing said asbestos layer to said casing.

2. In an electrical capacitor comprising a body of interleaved elements of conducting and easily inflammable dielectric material, a relatively rigid protective casing enveloping the condenser body, a layer of asbestos completely covering the outer surface of said casing, and a layer of non-inflammable adhesive substance affixing said asbestos layer to said casing.

3. In an electrical capacitor comprising a body of interleaved elements of conducting and easily inflammable dielectric material, a relatively rigid protective casing enveloping the condenser body, a layer of asbestos completely covering the outer surface of said casing, and a layer of non-inflammable varnish affixing said asbestos layer to said casing.

4. In a paper capacitor, a convolute capacitor body consisting of metallic and paper strips wound into a roll, a substantially rigid tubular protective casing of fibrous insulating and easily inflammable material enveloping said capacitor body, a layer of asbestos completely covering the outer surface of said casing, and a non-inflammable adhesive substance affixing said asbestos layer to said casing.

WILLIAM M. ROBINSON.